United States Patent [19]
Maijers et al.

[11] 3,793,569
[45] Feb. 19, 1974

[54] ROLL CAPACITOR HAVING A HOLLOW PIN

[75] Inventors: Andries Cornelis Maijers; Pieter Beekenkamp, both of Emmasingel, Eindhoven, Netherlands

[73] Assignee: U.S. Philips Corporation, New York, N.Y.

[22] Filed: Nov. 29, 1972

[21] Appl. No.: 310,348

[30] Foreign Application Priority Data
Dec. 1, 1971 Netherlands.................... 7116477

[52] U.S. Cl................ 317/230, 174/50.56, 317/260
[51] Int. Cl.............................................. H01g 9/10
[58] Field of Search.......... 317/260, 230; 174/50.56

[56] References Cited
UNITED STATES PATENTS
2,091,591  8/1937  Hartzell .............................. 317/260
3,389,311  6/1968  Rayno ............................... 174/50.56

Primary Examiner—E. A. Goldberg
Attorney, Agent, or Firm—Frank R. Trifari

[57] ABSTRACT

A roll capacitor having a cylindrical metal housing in which a pin is provided which is connected to the housing and through which at least one electrical connection wire is passed which is enveloped by an insulating jacket. In the hollow pin at least one circumferential ridge is provided for sealing the capacitor.

8 Claims, 2 Drawing Figures

PATENTED FEB 19 1974  3,793,569

ROLL CAPACITOR HAVING A HOLLOW PIN

The invention relates to a roll capacitor comprising a cylindrical housing having a central hollow pin which extends parallel to the longitudinal axis of the housing and which is connected to the housing through a circular bottom portion which is transverse to the longitudinal axis. The pin is enveloped by a capacitor roll which is arranged in the housing and which is provided with at least one electrical connection which is fed out of the roll capacitor through the hollow pin.

In a known roll capacitor of the kind set forth (British Pat. No. 636,013) the capacitor roll is accommodated in a cylindrical inner housing of an electrically insulating material which is arranged in a cylindrical metal outer housing. Connected to the capacitor roll are two electrical connections which consist of an electrically conductive wire with an insulating jacket. Both connections are fed out of the inner housing of insulating material through the hollow pin and are electrically connected to one of two feed-through pins which are provided in a disc which is made of insulating material and which closes the unilaterally open metal housing. Furthermore, a cup-like sealing of a synthetic resin material is provided on the side of the capacitor roll where the electrical connections are connected, the said sealing being provided with two conical openings for passage of the electrical connections.

A drawback of the described capacitor is that use is made of a cup-like sealing which is of a comparatively complex shape and which is expensive in bulk manufacture; moreover, it is difficult to mount this sealing.

The invention has for its object to provide a roll capacitor having a very reliable sealing which can be readily realized in bulk manufacture.

To this end the invention is characterized in that the cylindrical housing, the hollow pin and the circular bottom portion are made of metal, whilst for the sealing of the capacitor the electrical connection which is at least partly enveloped by an elastic insulating jacket is anchored in the hollow pin by means of one or more circumferential ridges which are provided in the pin.

The invention will be described in detail with reference to the drawing.

Figure 1:
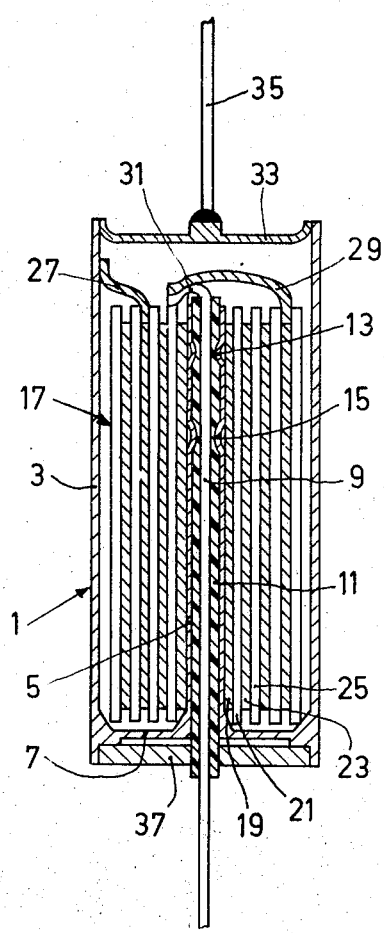
FIG. 1 is a diagrammatic longitudinal sectional view of a first embodiment of a roll capacitor according to the invention.

The roll capacitor shown in FIG. 1 comprises an aluminium cylindrical housing 1 having an outer jacket 3 and a central hollow pin 5 which extends parallel to the longitudinal axis of the housing and which is connected to the outer wall of the housing 1 via a bottom portion 7. The outer jacket 3, the hollow pin 5 and the bottom portion 7 form an integral unit which is obtained, for example, by moulding. In the hollow pin 5 an electrically conductive wire 9 is provided which is enveloped over part of its length by a jacket 11 of an electrically insulating elastic material, for example, silicon rubber or natural rubber. The insulating jacket 11 can be rigidly provided on the wire 9 or can consist of a sleeve which is slid about the wire 9. In the hollow pin 5 two circumferential ridges 13 and 15 are provided. About the hollow pin 5 a roll 17 is slid which is successively composed of an etched aluminium foil 19 (cathode foil) which is in electrical contact with the hollow pin 5, a paper foil 21 which is impregnated with a commonly used electrolyte, a formed aluminium foil 23 (anode foil), and another electrolyte-impregnated paper foil 25. In order to prevent short-circuits, the width of the paper foil exceeds that of the aluminium foil. A cathode connection lug 27 and an anode connection lug 29 are provided on the upper side (in the drawing) of the roll 17. The cathode connection lug 27 is welded to the outer jacket 3 of the housing 1, and the anode connection lug 29 is welded to a stripped end 31 of the wire 9 which projects above the hollow pin 5. The anode connection lug 29 is pressed, together with the end 31 of the wire 9 which is welded thereto, onto the upper edge of the roll 17. As a result, the roll 17 is located between the bottom portion 7 and the end 31. An annular plate which engages the outer jacket 3 of the housing 1 and which is provided with passages can alternatively be pressed onto the roll. The housing 1 is hermetically sealed on the upper side by means of an aluminium dish-like lid 33 which is welded to the housing 1, for example, by ultrasonic welding. On the lid 33 a connection wire 35 is provided. The housing 1 is closed on the lower side by an aluminium plate 37 which is welded to the housing and which comprises a passage for the wire 9 which is stripped over its part extending outside the housing 1. A tin-dipped copper wire is preferably used for the wire 9 so that it can be soldered to a metal conductor, for example, on a printed wiring board. Even though the roll capacitor described with reference to FIG. 1 is an electrolytic capacitor, it will be obvious that the roll 17 can also be composed in another manner. For example, instead of the electrolyte-impregnated paper foil, a fibre-glass foil impregnated in manganese nitrate can be used, the manganese nitrate being converted into manganese dioxide (brownstone powder) by heat treatment (so-termed pyrolysis). A dry aluminium capacitor is then obtained. It is alternatively possible to use a Mylar foil which is wound between two metal foils. The metal for the housing 1 is not restricted to aluminium. For example, it is also possible to use a copper or Monel housing. The inner diameter of the hollow pin 5 can also be chosen to be slightly larger than the outer diameter of the insulating jacket 11. The space which is thus produced between the insulating jacket and the hollow pin 5 can be filled with an electrically insulating material.

The sealing by means of the circumferential ridges 13 and 15 is very reliable due to the comparatively small circumference over which sealing takes place. For many applications this implies that the sealing between the plate 37 and the housing 1, and also the sealing between the plate 37 and the wire 9, are no longer subject to severe requirements. It is even possible to omit the circular plates 37 and 67 completely.

Figure 2:
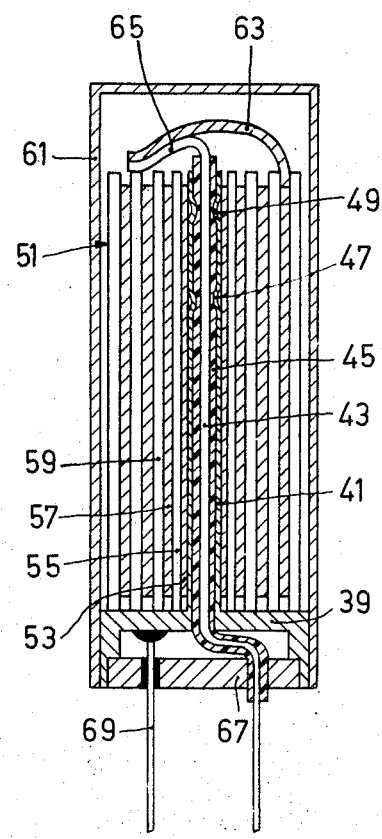
FIG. 2 is a diagrammatic longitudinal sectional view of a second embodiment of a roll capacitor according to the invention.

The roll capacitor shown in FIG. 2 comprises a circular bottom portion 39 which forms an integral unit with the hollow pin 41 which is arranged transverse thereto. The bottom portion 39 and the hollow pin 41 are made of aluminium. In the hollow pin 41 an electrically conductive wire 43 is provided which is enveloped over part of its length by a jacket 45 of an electrically insulating elastic material, such as, for example rubber. The hollow pin 41 is provided with two circumferential ridges 47 and 49. The number of circumferential ridges must at least amount to one, and is further restricted only by the dimensions of the capacitor and the tool used for making the ridges. The unit formed by the bottom portion 39 and the hollow pin 41 is preferably also used as a mandrel for providing a capacitor roll 51. In the capacitor shown in FIG. 2 an etched aluminium foil 53 (cathode foil) is welded over its full width to the outer side of the hollow pin 41 so as to form a start for winding. The roll 51 is further composed of a first paper foil 55 which is impregnated with a commonly used electrolyte, a formed aluminium foil 57 (anode foil), and a second impregnated paper foil 59. A unilaterally open aluminium can 61 is slid over the roll 51, the can being welded to the circular bottom portion 39. On the upper side of the roll 51 an anode connection lug 63 is provided which is welded to a stripped end 65 of the wire 43. The anode connection lug 63 and the end 65 are bent onto the roll 51 so as to anchor the roll in the axial direction. Provided on the lower side of the capacitor is a circular metal plate 67 which is welded to the bottom portion 39. The wire 43, enveloped by the insulating jacket 45, is fed out through a first opening in the plate 67, a connection wire 69 which is connected to the bottom portion 39 being fed out through a second opening.

If the hollow pin 41 is not used as a winding mandrel, but a pre-manufactured roll is slid onto the pin 41, a cathode connection lug must be welded to the can 61 so as to obtain a proper cathode connection. This is done on the upper side of the roll (see FIG. 1).

The sequence of the foils of the roll can be reversed so that the anode foil is arranged about the hollow pin. However, if the capacitor housing is to be kept at cathode potential, an insulating layer can be provided between the anode foil and the hollow pin. For a number of applications, however, there is no objection against the capacitor housing having anode potential. It will be obvious that the capacitor roll can also be of the multiple type, i.e., having a number of anode foils. All of the electrically conductive wires which are connected to these foils are then fed through the hollow pin and are anchored therein by circumferential ridges.

What is claimed is:

1. A roll capacitor comprising a cylindrical housing having a central hollow pin which extends parallel to the longitudinal axis of the housing and which is connected to the housing through a circular bottom portion which is transverse to the longitudinal axis, a capacitor roll arranged within the housing enveloping said pin and provided with at least one electrical connection fed out of the roll capacitor through the hollow pin, the cylindrical housing, the hollow pin and the circular bottom portion being made of metal, the electrical connection at least partly enveloped by an elastic insulating jacket is anchored in the hollow pin by means of one or more circumferential ridges which are provided in the pin and which provide sealing means for the capacitor roll from the outside.

2. A roll capacitor as claimed in claim 1, wherein the hollow pin, the circular bottom portion and the housing form an integral unit, the assembly thus formed being closed on at least one side by a circular plate.

3. A roll capacitor as claimed in claim 1, wherein the hollow pin and the circular bottom portion form one integral unit, the housing consisting of a unilaterally open can which is connected to the bottom portion along its circumference.

4. A roll capacitor as claimed in claim 2 wherein the electrical connection which is anchored in the hollow pin is an electrically conductive wire which is covered with insulating material.

5. A roll capacitor as claimed in claim 4 wherein the end of the electrical connection which is situated inside the capacitor is connected to a connection lug which projects from the capacitor roll and which is pressed, together with the connection lug, onto the near side of the roll.

6. A roll capacitor as claimed in claim 1, characterized in that the capacitor roll is formed by a formed aluminium anode foil layer, a paper foil layer which is impregnated with a commonly used electrolyte, an aluminium cathode foil layer, and a second impregnated paper foil layer which are successively wound about the hollow pin, the cylindrical housing, the hollow pin and the circular bottom portion being made of aluminium.

7. A roll capacitor as claimed in claim 3 wherein the electrical connection which is anchored in the hollow pin is an electrically conductive wire which is covered with insulating material.

8. A roll capacitor as claimed in claim 7, wherein the end of the electrical connection which is situated inside the capacitor is connected to a connection lug which projects from the capacitor roll and which is pressed, together with the connection lug, onto the near side of the roll.

* * * * *